United States Patent
Lohner et al.

(10) Patent No.: US 6,370,471 B1
(45) Date of Patent: Apr. 9, 2002

(54) AUTOMATIC FOLLOWING GUIDANCE SYSTEM FOR MOTOR VEHICLES

(75) Inventors: Herbert Lohner, Friolzheim; Peter Dominke, Bietigheim-Bissingen; Chi-Thuan Cao, Korntal-Muenchingen; Klaus-Dieter Leimbach, Moeglingen; Werner Harter, Illingen; Mathias Hommel, Wolfsburg, all of (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 09/719,071
(22) PCT Filed: Apr. 6, 2000
(86) PCT No.: PCT/DE00/01097
  § 371 Date: Jan. 8, 2001
  § 102(e) Date: Jan. 8, 2001
(87) PCT Pub. No.: WO00/62139
  PCT Pub. Date: Oct. 19, 2000

(30) Foreign Application Priority Data

Apr. 9, 1999 (DE) .......................................... 199 16 095

(51) Int. Cl.[7] ............................................. G06F 165/00
(52) U.S. Cl. ........................... 701/96; 701/200; 701/36; 73/178 R
(58) Field of Search .............. 701/96, 23, 36, 701/200, 41, 93, 70, 178 R

(56) References Cited

U.S. PATENT DOCUMENTS

| 4,887,223 | A | | 12/1989 | Christian |
| 5,179,441 | A | | 1/1993 | Johnson et al. |
| 5,684,696 | A | * | 11/1997 | Rao et al. ...................... 701/25 |
| 5,925,080 | A | * | 7/1999 | Shimbara et al. ............. 701/23 |
| 5,957,983 | A | * | 9/1999 | Tominaga ..................... 701/23 |
| 5,961,559 | A | * | 10/1999 | Shimbara et al. ............. 701/23 |
| 6,115,652 | A | * | 9/2000 | Sato et al. ..................... 701/28 |
| 6,138,062 | A | * | 10/2000 | Usami |

* cited by examiner

Primary Examiner—William A. Cuchlinski, Jr.
Assistant Examiner—Olga Hernandez
(74) Attorney, Agent, or Firm—Baker & Daniels

(57) ABSTRACT

The invention concerns a system for automatic following guidance, particularly for heavy-traffic automatic following guidance, of a motor vehicle (1), designed to ease the burden on the driver in heavy-traffic situations both by taking over lateral guidance by means of an automatic steering regulation system and by maintaining a set distance from a leading vehicle. The latter function requires an adaptive cruise and braking regulation system with "stop" and "go" function. According to the invention, selection and decision means (5, 6, 7, 8, 9) are provided that select both the regulating parameters and the types of controllers [sic], e.g., following guidance of the motor vehicle (1) on the basis of lane markings recognized by means of a video camera or on the basis of a recognized leading vehicle. The system is divided into hierarchical levels I–IV, the driver always being in the monitoring and adaptation loop assigned to the top level IV of the hierarchy, so that he has the highest priority and can override the system at any time.

17 Claims, 2 Drawing Sheets

AUTOMATIC FOLLOWING GUIDANCE SYSTEM FOR MOTOR VEHICLES

PRIOR ART

Figure 1:
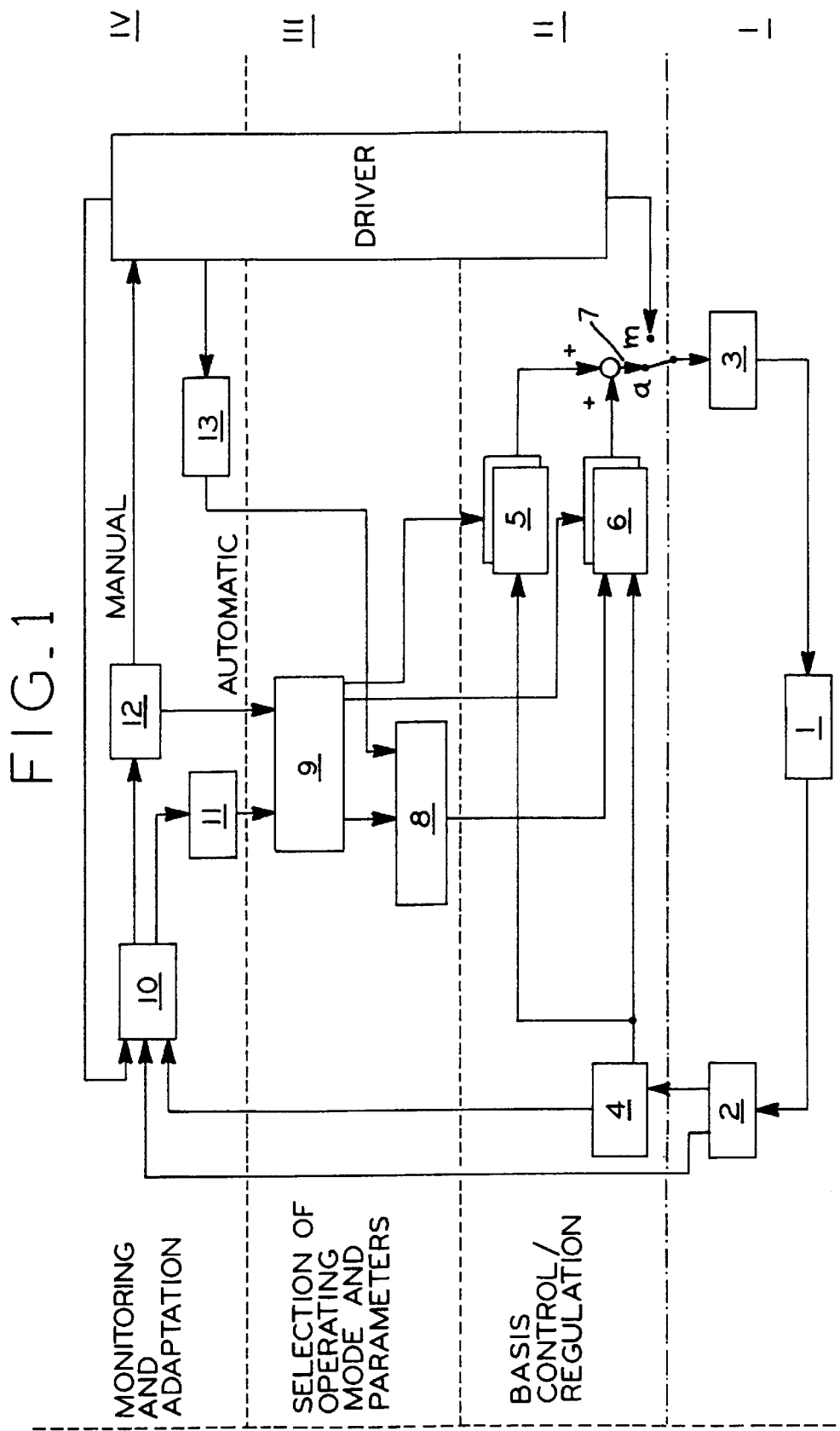

The invention concerns a system for automatic following guidance, particularly for heavy-traffic following guidance, of a motor vehicle, comprising an electronic cruise, braking and steering control/regulation system, an environmental image acquisition unit equipped with a video camera and downstream image analysis and generating signals that can be input to the electronic cruise, braking and steering control system at least for automatic guidance along a marked traffic lane, and/or an environmental detection unit operating on the basis of detected reflections of emitted electromagnetic radiation, and a spacing and relative-speed detection unit that detects a spacing and a relative speed with respect to a leading vehicle selectable on the basis of signals generated by the environmental image acquisition unit and generates in each case a corresponding spacing and relative speed detection signal.

A similar system is described in U.S. Pat. No. 5,684,697. In the known system, image frames supplied by the video camera are digitized and are processed by a computer, which automatically controls or regulates the steering, acceleration, deceleration and braking of the vehicle within specified criteria. The automatic steering of the vehicle is based on the acquisition of images of stripe-shaped road markings, whereas the automatic speed control or regulation is based on detecting the location of a leading vehicle within the marked traffic lane.

By contrast, a further system, known from U.S. Pat. No. 5,572,449, employs speed signals that are detected both by a vehicle to be controlled and by a preceding, leading vehicle and are exchanged via a communication system in order to determine the relative speed between the two vehicles and to generate control signals that stabilize the speed and thus a safe following distance of the trailing vehicle with respect to the leading vehicle, and further, to control the steering in such a way that the trailing vehicle can follow the preceding one. A disadvantage here is that all vehicles traveling in a column must be equipped with the same system.

A further system, known from U.S. Pat. No. 5,245,422, like U.S. Pat. No. 5,684,697, employs a video camera and its images, processed by an image processor, to define the lane markings on the road and the position of the vehicle with respect thereto. The combined engagement of a cruise control switch and a steering control switch are [sic] detected and used to initiate the processing of the image data and automatic steering of the vehicle. However, the automatic maintenance of a given distance from a preceding, leading vehicle is not described in the above U.S. No. Pat. 5,245,422.

In heavy-traffic situations, it often happens that one vehicle in a column follows another traveling at a lower speed, e.g. less than 20 kmh, in the same lane. In such situations, the driver's attention is focused primarily on maintaining a given distance from the preceding driver, so as to have an adequate stopping distance in the event of sudden braking. At such low speeds and with the vehicles moving steadily, minor corrections, if any, are all that is needed in order to steer the vehicle. When these driving situations persist for a relatively long period of time, they often cause fatigue or distraction on the part of the driver, since they claim only a small share of his attention.

OBJECTS AND ADVANTAGES OF THE INVENTION

The object of the invention is to make possible a system for automatic following guidance, particularly for heavy-traffic following guidance, of a motor vehicle, which can effectively ease the burden on the driver in certain situations, for example in heavy-traffic situations, by taking over lateral guidance and spacing guidance with respect to a leading vehicle.

A prerequisite for such a system for automatic following guidance, particularly for heavy-traffic automatic following guidance, of a motor vehicle, is an automatic cruise control system with a "stop" and "go" function, which under predetermined conditions makes it unnecessary for the driver to operate the brake, gas and clutch pedals and which, in dependence on specific situations, permits automatic stopping, starting and travel up to a defined limiting speed, independently of actions by the driver. A further prerequisite for the functioning of such a system for automatic following guidance, particularly for heavy-traffic automatic following guidance, of a motor vehicle, is an automatic steering control or regulation system that can impose steering movements and/or steering torques on the steered wheels independently of any actuation of the steering wheel by the driver. A further prerequisite of the system according to the invention for automatic following guidance, particularly for heavy-traffic automatic following guidance, of a motor vehicle is the presence of lane markings and a leading vehicle that is within the lane markings and is moving slowly in the case of heavy traffic. The system vehicle follows the leading vehicle for as long as it travels within the lane markings and below a limiting speed. If the leading vehicle removes itself from consideration, for example by leaving the lane or exceeding the limiting speed, the system deactivates. The same applies when the lane can no longer be detected by means of the environmental image acquisition unit equipped with a video camera and a downstream image analyzer, for example if lane markings are no longer present or are ambiguous. A warning signal informs the driver of each impending deactivation of the automatic following guidance system, particularly of the heavy-traffic automatic following guidance system.

The system of the invention for automatic following guidance, particularly for heavy-traffic automatic following guidance, of a motor vehicle comprises selection and decision means which, on the one hand, decide on the basis of parameters that can be input by and/or are dependent on the driver and on the basis of conditions determined automatically by the system whether automatic following guidance is feasible or whether manual cruise, braking and steering control/regulation must be performed by the driver, whether only automatic guidance along a marked, recognized lane or following guidance based on a recognized leading vehicle or a combination of these types of automatic guidance is feasible, and which, on the other hand, also select on the basis of parameters that can be input by and/or are dependent on a driver and on the basis of conditions determined automatically by the system which of the parameters are to be used to decide between automatic and manual following guidance, and which, if automatic following guidance is performed, select the regulating parameters for cruise, braking and steering regulation.

In the system according to the invention for automatic following guidance, particularly for heavy-traffic automatic following guidance, of a motor vehicle, the following switching conditions are realized in the form of AND criteria:

The system is active only when the automatic cruise control/regulation system with "stop" and "go" control is active. The automatic "stop" and "go" control requires a release by the driver in order to start moving again after a stop.

The lane markings have been detected unequivocally by the environmental image acquisition unit. I.e., the lane recognition system detects, for example, two broken lines spaced up to 12 m apart, for example. Additionally or alternatively, sufficiently high curbs, for example projecting at least 10 cm above the surface of the road, can be recognized as the lane boundary for short distances.

The leading vehicle is present and has been recognized unequivocally by the environmental image acquisition unit.

The speed of the leading vehicle is below the limiting speed, i.e., below 20–30 km/h, for example.

The selection and decision means of the invention further realizes the following deactivation conditions as "OR" criteria:

if the activation conditions are not or are no longer present;

if the driver performs a steering action beyond a certain steering torque or a floor-pedal action, i.e., an action on the brake pedal, gas pedal or clutch pedal;

if the driver deactivates the system for automatic following guidance of a motor vehicle, e.g. by actuating a switch. In this case the system must deactivate immediately;

if lane markings are not or cease to be present or cannot be recognized unequivocally, or if the lane markings are present but there is no leading vehicle. In this case, after outputting a deactivation warning signal, the vehicle brakes to a stop with no action by the driver and the system deactivates after a defined waiting time, e.g. 1–2 s. The automatic braking operation is interrupted by any intervention on the part of the driver, whether on the steering wheel or on the accelerator or brake pedal, or by deactivation of the automatic cruise control;

if the limiting speed is reached. In this case, the system initially remains active and the system vehicle does not accelerate past the limiting speed. If the leading vehicle then leaves the control range of the system by increasing its speed, the system deactivates, after first giving a deactivation warning signal, since there truly is no longer a leading vehicle in this case.

Regardless of the manner of deactivation, the driver must be able to assume control of the vehicle at any time. Optionally, the automatic cruise control/regulation system can be deactivated along with the deactivation of the automatic steering control/regulation system.

The system of the invention for automatic following guidance, particularly for heavy-traffic automatic following guidance, of a motor vehicle, can be arranged to generate the following information signals and warning signals:

information signals can be generated if implausible driving by the leading vehicle within the recognized lane marking is detected, for example if the leading vehicle swerves or starts to make a lane change.

A deactivation warning can be generated before each system deactivation.

The system of the invention for automatic following guidance, particularly for heavy-traffic automatic following guidance, of a motor vehicle permits a modular and expandable, hierarchically organized controller structure that offers situation recognition by the system and/or by the driver and situation-dependent decision-making and selection via the control/regulating mode, i.e., manual or automatic control, selection of the type of control or regulation, i.e., lane following or following behind the leading vehicle, and selection of the controller parameters and the setpoint values for the regulating system.

Also optionally provided is a driver-type recognition unit that brings about driver-adaptive adjustment of the system. The driver has the highest priority in every case and can assume control of the system at any time, since he is always in the monitoring loop.

The claimed environmental recognition unit preferably operates by means of radar (Radio Detection and Ranging) and/or lidar (Light Detection and Ranging) emission.

A preferred embodiment of a system according to the invention for automatic following guidance of a motor vehicle is described in more detail hereinbelow with reference to the drawing. The invention is elucidated in particular with reference to automatic following guidance in heavy traffic.

DRAWING

Figure 2:
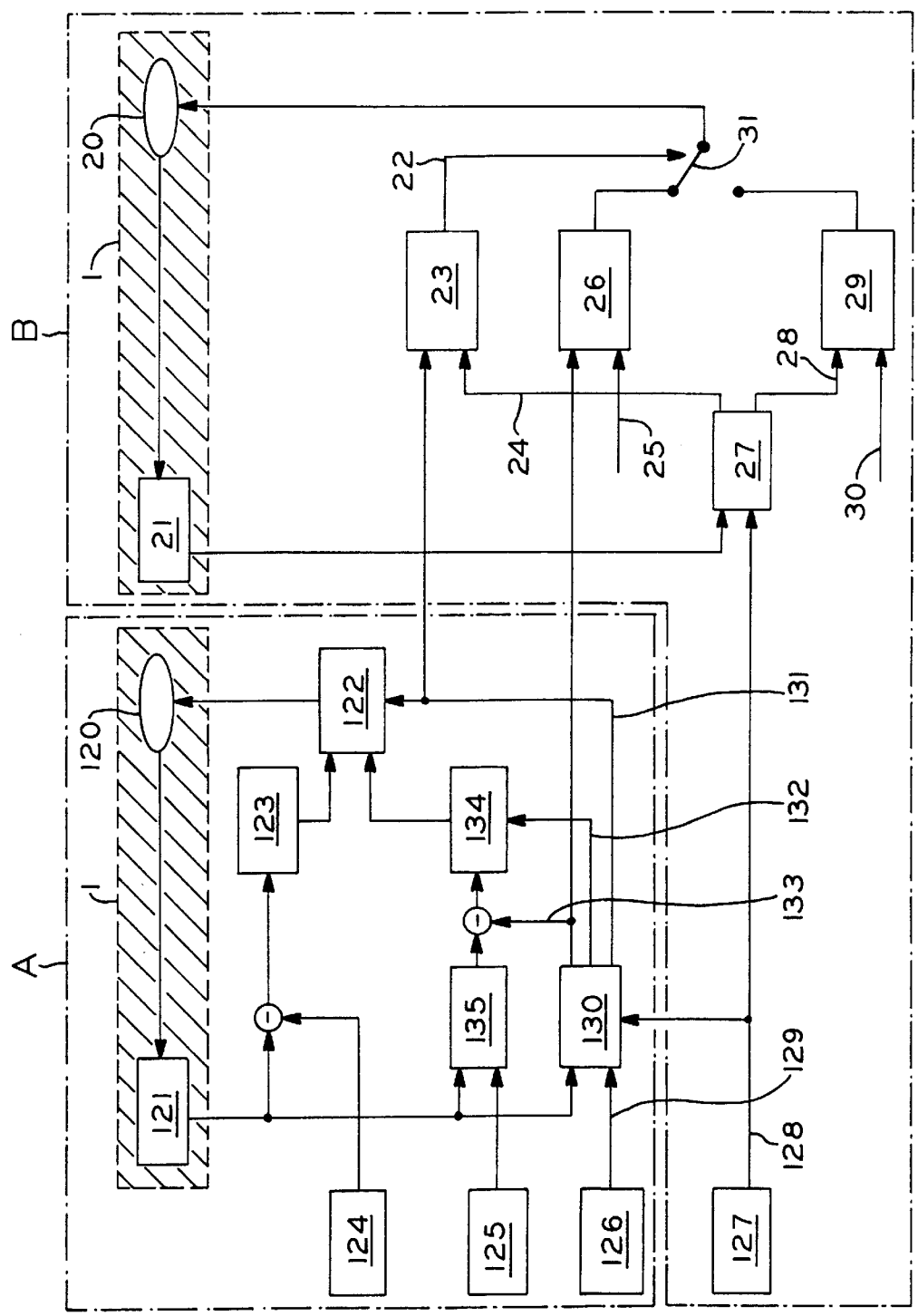

FIG. 1 is a functional block diagram that provides an overview of the structure of the system according to the invention; and FIG. 2, also a functional block diagram, depicts a controller structure of the system according to the invention, divided into longitudinal and lateral guidance functions.

EXEMPLARY EMBODIMENT

As is shown in FIG. 1 by the functional block diagram of the system according to the invention for heavy-traffic automatic following guidance, the controller structure is organized in hierarchical fashion. The levels of the hierarchy are identified in FIG. 1 as I, II, III and IV.

The lowest hierarchical level I includes the motor vehicle 1 with its assigned sensors 2 and final control elements 3. The sensors 2 include in particular the video camera, optionally with the downstream image analyzer and the spacing recognition sensor implemented by means of a radar system, for example, as well as other sensors present in the vehicle, for example a sensor for determining the actual vehicle speed, an acceleration sensor, a slope sensor, a lateral acceleration sensor, etc. Also included are sensors that detect the steering-wheel angle imposed at the steering wheel and the actual steering angle to which the wheels to be steered are adjusted by means of the automatic steering control/regulation system. The sensors mentioned here are merely examples. Corresponding signals can also be supplied by other control units present in the vehicle.

The final control elements 3 serve to control the longitudinal and lateral movement of the vehicle independently of the type of drive. For example, final control elements can be provided for control/regulation of the internal combustion engine, such as its rotation speed, throttle-valve angle, injection quantity and/or injection interval, final control elements for automatic or manual braking, and one or more electric servomotors for adjusting a steering angle at the steered wheels independently of the steering-wheel angle.

The next hierarchical level II represents the basic control/regulation system and comprises a state estimator 4 acted on by the signals supplied by sensors 2, selectable controller types or control laws for forward controls 5, and selectable controller types or control laws for regeneration controls 6, the selected controller types/control laws being compiled via an adder, as well as a reversing switch 7 that switches between automatic and manual driving of the final control elements 3. The control laws of the forward control 5 and those of the regeneration control 6 use results from the state estimator 4 and from unit 8, which has the function of adapting the controller parameters and the setpoint values, and are selected independently of results affecting a control-mode selection unit 9. Units 8 and 9 are assigned to the next-higher level III of the hierarchy. In the highest hierarchical level TV, which performs the functions of monitoring and adaptation, a unit 10 analyzes the situation based on the results supplied by the state estimator 4, sensor signals from the control sensors 2, and driver inputs, and generates an analytical result that is processed in a decision unit 12 and contributes substantially to the decision as to whether manual or automatic control or regulation is to be carried out for heavy-traffic automatic following guidance. The situation analyzed by unit 10 is further used, via a unit 11, to select the controller mode by means of selection unit 9, particularly to determine whether following guidance with respect to a preceding leading vehicle or guidance with respect to the lane markings is to be performed.

The highest hierarchical level IV optionally includes an adaptive driver-type recognition system that acts on the setpoint-value and parameter adaptation unit 8 in accordance with a recognized driver type. Such adaptive driver-type recognition can also be replaced or supplemented by appropriate driver-type information input by the driver himself.

Thus, by directly influencing situation analyzer 10 and reversing switch 7, the driver is able at any time to adapt the heavy-traffic automatic following guidance of the system to the existing situation or to deactivate it and drive the vehicle manually. Because the driver spans levels II–IV of the hierarchy, he himself has the highest priority and can override the system at any time. As a result of the situation analysis 10, which can be influenced at the driver's discretion and is acted upon by the sensor signals, a situation-dependent decision is reached concerning the control/regulation mode, "manual" or "automatic," the type of control or regulation, e.g. based on the recognized lane marking or based on the recognized leading vehicle, and, via units 8 and 9, the choice of the parameters and setpoint values (units 5 and 6) for the control/regulation system. The optionally provided driver-type recognition unit 13 permits driver-adaptive adjustment by acting on the setpoint-value and parameter adaptation unit 8.

The system for heavy-traffic automatic following guidance explained with reference to the functional block diagram shown in FIG. 1 advantageously has a hierarchical and expandable structure and functions in a situation- and driver-adaptive manner in which the driver is always in the monitoring loop, has the highest priority and can override the system at any time. Thus, the driver can at any time assess the traffic situation himself and assume responsibility for his vehicle by deactivating the heavy-traffic automatic following guidance system.

The hierarchically organized functional structure of the system of the invention for heavy-traffic automatic following guidance shown in FIG. 1 is depicted further in FIG. 2, again in the form of a functional block diagram, which divides the functions according to the invention into cruise and braking control or regulation A (in the lefthand portion of FIG. 2) and automatic steering control/regulation B (in the righthand portion of FIG. 2).

Cruise and Braking Control and Regulation System with "Stop" and "Go" Function

Entered in the upper portion of Section A are the cruise and braking control and regulation functions assigned directly to the vehicle 1, i.e., final control elements 120 and sensors, in particular a sensor 121 for detecting the vehicle speed. The measured vehicle speed is input along with a set desired speed 124 to a speed regulator 123, which acts on a selection function 122 for selecting the regulating mode. Additional input variables of the cruise and braking control or regulation system A are a time spacing with respect to the leading vehicle 125, vehicles 129 detected by a radar system 126, and detected lane markings 128, which are a result of the analysis of image frames supplied by a video camera 127. Based on the detected lane marking 128 and the detected vehicles 129, the selection function 130 selects an appropriate preceding leading vehicle (output variable 131). Additional output variables from the vehicle selector 130 are the relative speed 132 and the distance 133 of the preceding vehicle from the system vehicle. The actual distance 133 determined in this way is combined with the desired distance computed from the measured speed of the system vehicle, and the combined result acts upon a distance-regulating function 134, which also receives as an input variable the relative speed 132 resulting from the selection function 130. In a selection function 122, the control or regulating mode of the cruise and braking control or regulation system A is selected, i.e., either speed regulation 123 or distance regulation 134, in order to drive the final control element 120.

Automatic Steering Control/Regulation System B

The automatic steering control/regulation system B, shown in the righthand portion of FIG. 2, again includes the cross-hatched level of vehicle 1 with the final control elements 20 assigned to the vehicle and needed for automatic steering control or regulation, together with sensors 21 for detecting the actual position of the system vehicle. Regulating part B receives as input variables the information 131 regarding the detected leading vehicle, the actual distance 133 between the system vehicle and the leading vehicle, and the lane markings 128 acquired from the analyzed image frames from the video camera 127. From the actual position of the driver's vehicle, supplied by sensors 21, and the lane markings 128 acquired from the image frames of the video camera, a selection function 27 selects the appropriate lane marking for automatic steering control or regulation B. If this is a lane marking 24 in front of the system vehicle, this information 24, together with the information 131 from the lefthand regulating part A concerning the detected preceding leading vehicle, acts on a selection function 23 to select the regulating mode, which, by means of a selection function depicted symbolically as reversing switch 31, chooses whether the automatic steering control or regulation B is to be leading-vehicle following regulation 26 or lane-marking following regulation 29. The leading-vehicle following regulation system 26 receives as an input variable the distance 133, determined in Part A, of the system vehicle from the preceding leading vehicle and a setpoint value 25, whereas the lane-marking following regulation system 29 receives from selection function 27 a datum concerning a suitable selected lane marking 28 and a setpoint value 30. The final control elements 20 are then adjusted according to the automatic steering control or regulating mode selected by the selection function 31, i.e., either according to leading vehicle following regulation 26 or lane-marking following regulation 29.

It should be mentioned that the functions organized hierarchically according to FIG. 1 and according to regulating modes A and B in FIG. 2 can be performed by a suitably arranged control/regulating unit. However, it goes without saying that the functions can also be performed by separate control/regulating units whose programs are organized according to the separate functions A and B shown in FIG. 2.

An embodiment of the system of the invention for automatic following guidance of a motor vehicle in heavy traffic can include the following operating elements and displays:

on/off switch
optionally a keyboard for inputting driver-type information, which, as stated, can replace or supplement the automatic driver-type recognition unit 13;
display: "System is ready for use," i.e., the conditions for its activation have been met;
display: "System is active";
display: "System is (will be) deactivated."

The following list gives by way of example some situations, the ensuing system responses, and data that are communicated to a driver:

A leading vehicle that is moving from side to side in the lane, i.e., the leading vehicle is swerving or is traveling in an implausible manner. Information to this effect is displayed to the driver. The system can then use its built-in intelligence and watch for obstacles and respond autonomously. Appropriate threshold values are needed for this purpose.
A lane change by the leading vehicle with immediate recognition of a new leading vehicle. Corresponding information is generated for the driver.
Cutting in by a vehicle, in which case the vehicle cutting in becomes a new leading vehicle. Information to this effect is displayed to the driver of the system vehicle. If a vehicle cuts in too closely, braking is necessary, for example at more than 0.5 g. For this purpose, the automatic steering system allows an additional degree of freedom for swerving.
A lane change by the leading vehicle with no recognition of a new leading vehicle. The system is deactivated and a corresponding deactivation warning is generated and displayed. In the event of a sudden lane change by the leading vehicle, for example to avoid an obstacle, the dead time can be shortened or the maximum delay increased. If an object or a leading vehicle is then recognized reliably, the maximum deceleration of 0.5 g can be increased.
The lane marking can no longer be detected, but a leading vehicle is still present. The system then deactivates with a deactivation warning.
Stationary objects that are not vehicles, e.g. electronic flares, construction barriers, lost loads, are in the lane. If these objects have been detected reliably, the system can respond by deactivating with a deactivation warning.
An intersection is recognized by the absence or discontinuation of the lane marking. The system can then deactivate with a deactivation warning.

As a development of the invention, a model of the environment can be created in the system and the path of the lane can be calculated in advance by this means. This ensures that the system will be able to respond to greater distances between lane markings, e.g. if they are covered with snow, or to leading vehicles that are not traveling in alignment.

A suitably adjusted aperture for the video camera and/or the use of a plurality of spaced-apart video cameras ensures the recognition of situations that would otherwise be unclear.

What is claimed is:

1. A guidance system for a motor vehicle which comprises
an electronic cruise, braking and steering control/regulation system;
at least one of an environmental image acquisition unit which includes a video camera and an image analyzer for generating signals that are used to control said electronic cruise, braking and steering control/regulation system for automatic guidance of said vehicle along a marked lane, and an environmental detector that detects reflections of emitted electromagnetic radiation;
a spacing and relative speed processor coupled to at least one of said environmental image acquisition unit and said environmental detector for receiving output signals therefrom and determining from said output signals spacing and relative speed of said vehicle with respect to a lead vehicle, said spacing and relative speed processor further generating spacing and relative speed signals;
a control mode selector and a decision maker both of which are coupled to said spacing and relative speed processor for receiving said spacing and relative speed signals; and
a driver input coupled to said control mode selector and said decision maker for inputting driver information into said control mode selector and said decision maker,
said decision maker determining whether to allow manual or automatic guidance control of said vehicle, and
said control mode selector determining parameters that are used to control said electronic cruise, braking and steering control/regulation system.

2. The guidance system for a motor vehicle according to claim 1, wherein said decision maker further determines whether to conduct automatic guidance of said vehicle using lane markings.

3. The guidance system for a motor vehicle according to claim 1, wherein said decision maker further determines whether to conduct automatic guidance of said vehicle using the spacing and relative speed of said lead vehicle.

4. The guidance system for a motor vehicle according to claim 1, further comprising a control signal adjuster that is coupled to said control mode selector and adjusts control signals therefrom based upon at least one of set points and inputted driver information.

5. The guidance system for a motor vehicle according to claim 1, further comprising a driver-type recognizer which is coupled to said control signal adjuster and forwards signals thereto which correspond to different drivers.

6. The guidance system for a motor vehicle according to claim 1, wherein said decision maker activates automatic following guidance only when said environmental image acquisition unit has recognized marked lanes and has ascertained that a lead vehicle is traveling within said recognized marked lanes.

7. The guidance system for a motor vehicle according to claim 1, wherein said decision maker activates automatic following guidance only when a lead vehicle is traveling below a limiting speed.

8. The guidance system for a motor vehicle according to claim 1, wherein said decision maker activates automatic following guidance only when a driver activates said system after a stop and restart.

9. The guidance system for a motor vehicle according to claim 1, wherein said decision maker deactivates automatic following guidance when a lead vehicle departs from a marked lane and no new lead vehicle is recognized or traveling faster than a limiting speed.

10. The guidance system for a motor vehicle according to claim 1, wherein said decision maker deactivates automatic following guidance when a driver performs a steering maneuver that exceeds at least one of a specified steering torque and a specified steering angle.

11. The guidance system for a motor vehicle according to claim 1, wherein said decision maker deactivates automatic following guidance when a driver manipulates an accelerator pedal of said vehicle.

12. The guidance system for a motor vehicle according to claim 1, wherein said decision maker deactivates automatic following guidance when a driver has activated said system but conditions for activation are not met.

13. The guidance system for a motor vehicle according to claim 1, wherein said decision maker deactivates automatic following guidance upon a manual input by a driver.

14. The guidance system for a motor vehicle according to claim 1, wherein said decision maker deactivates automatic following guidance when said environmental image acquisition unit has ascertained that no lane markings are present.

15. The guidance system for a motor vehicle according to claim 1, further comprising a warning signal generator that produces a warning signal for a driver upon deactivation of automatic following guidance.

16. The guidance system for a motor vehicle according to claim 1, wherein said spacing and relative speed processor comprises a radar detector.

17. The guidance system for a motor vehicle according to claim 1, wherein said environmental detection unit comprises at least one of a radar detector and a lidar detector.

* * * * *

UNITED STATES PATENT AND TRADEMARK OFFICE
CERTIFICATE OF CORRECTION

PATENT NO.     : 6,370,471 B1
DATED          : April 9, 2002
INVENTOR(S)    : Herbert Lohner et al.

It is certified that error appears in the above-identified patent and that said Letters Patent is hereby corrected as shown below:

<u>Title page,</u>
Item [57], please delete the ABSTRACT and in place thereof, substitute the following ABSTRACT:

-- An automatic following guidance system for motor vehicles that includes an electronic cruise, braking and steering control/regulation system, and an environmental image acquisition unit equipped with a video camera and an image analysis means for generating signals that can be input to the electronic cruise, braking and steering control system at least for automatic guidance along a marked traffic lane. In addition to, or alternatively to the video camera and image analysis means, the system can include an environmental detection unit operating on the basis of detected reflections of emitted electromagnetic radiation. The system further includes a spacing and relative-speed detection unit that detects spacing and a relative speed with respect to a leading vehicle selectable on the basis of signals generated by the environmental image acquisition unit and generates in each case a corresponding spacing and relative speed detection signal. --

Signed and Sealed this

Third Day of September, 2002

Attest:

Attesting Officer

JAMES E. ROGAN
*Director of the United States Patent and Trademark Office*